Sept. 15, 1931.   P. BALBAUD   1,823,229
SEPARABLE FASTENER
Filed Aug. 1, 1930

INVENTOR
Paul Balbaud
BY
Willis and Hastings
ATTORNEYS

Patented Sept. 15, 1931

1,823,229

UNITED STATES PATENT OFFICE

PAUL BALBAUD, OF PARIS, FRANCE

SEPARABLE FASTENER

Application filed August 1, 1930, Serial No. 472,461, and in France March 10, 1930.

This invention relates to separable fasteners of widely variant types, in which two members are detachably engaged by catch devices, portions of which are carried by each member.

In coupling devices of the usual type, attachment is ordinarily accomplished by pressing the members together in a straight line; in other types by a relative lateral movement, and in other forms a third element is employed to cause positive engagement.

A reverse effect, that of detachment, is attained by exerting a pull on the elements to overcome the tensional resistance to separation, an oppositely applied transverse movement, or the retraction of an engaging member, such as a runner.

Certain types of separable fasteners maintain the parts in rigid relation, while for most purposes a definite degree of flexibility or rather universal yielding, is desirable, without danger of accidental parting by contact with other articles, etc.

It is therefore an object of this invention to provide forms of separable fasteners which may be positively united by the application of lineal pressure only, whereby they are effectively held to resist any tensional strain, and which are disconnected by the exertion of further pressure in the same direction.

A further feature is in the provision of separable fastener connecting means which permit the engaged members to move freely into different angular planes with respect one to another, without binding, cramping or danger of becoming separated.

Another aim is to produce a separable fastener that is easily and inexpensively produced, well adapted for long service, and which is of neat and attractive appearance.

These advantageous objects are accomplished by the novel and practical construction, arrangement and combination of parts hereinafter described and shown in the accompanying drawings, forming a material part of this disclosure, and in which:—

Figure 1:
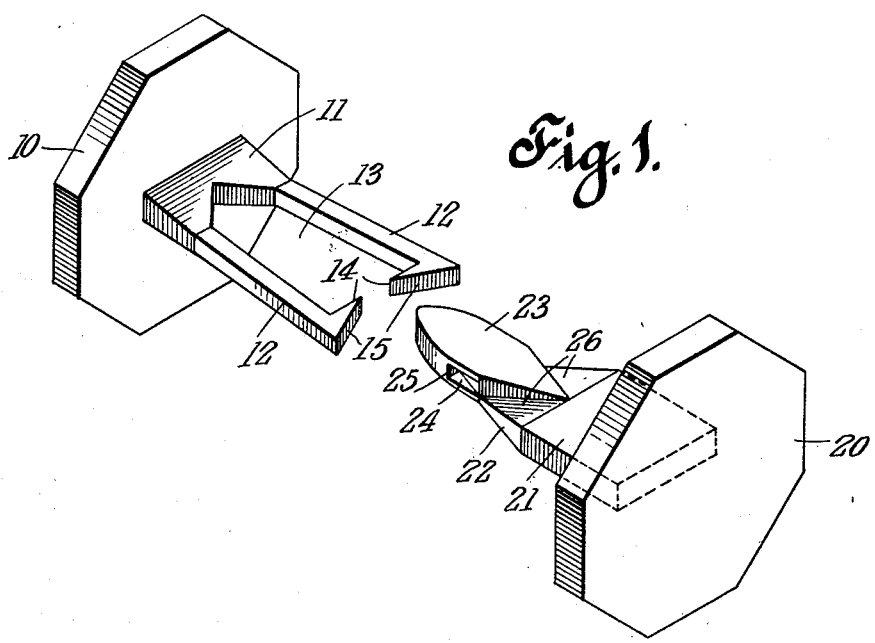
Figure 1 is a perspective view of the device as applied to a separable cuff button, shown in detached position.
Figure 2:
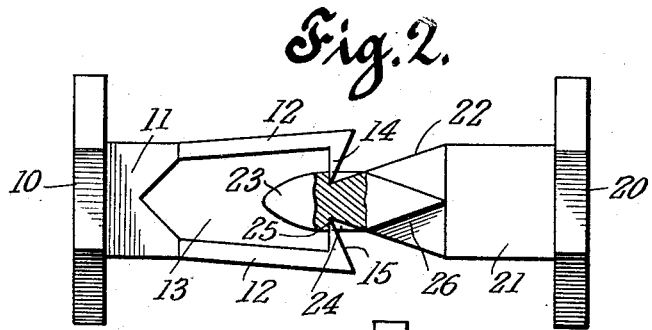
Figure 2 is a side elevational view of the same, shown as united, parts being in section.

Although the fasteners are shown as incorporated with a certain well known article, namely a cuff link, it is to be understood that the invention has a wide scope of application, unrestricted to the article, which is given only as an example of its use, particularly where absolute rigidity is not desirable.

Such cuff links or buttons are shown as formed of two head members 10 and 20, which may present any desired contour and be embellished in any fanciful manner whatever.

Set rigidly in the inner side of the head 10 is a flat metallic stub 11 extending at a right angle and terminating in two spring arms 12 having a space 13 therebetween, these arms being provided at the outer ends with inreaching detents 14 presenting convergently bevelled faces 15 slightly separated at their opposed inner edges.

A similar but thicker stub 21 is fixed in the back of the button 20, its main portion presenting angular edges 22 converging into an elongated flattened conical catch 23, each edge of which is curved to an acute point at the end, and formed in the narrow edges of the catch 23 are opposed recesses 24, the bottoms of these recesses being prolongations of the converging angular side edges 22 extending to transverse abutments 25 in the catch.

Extending from the junction of the catch edges with the stub 21 are ramps 26 converging at their inner ends, these ramps having angularly inclined faces reaching from one side of the flat stub to the other and adapted to receive the detents 14, as they are pressed rearwardly out of the recesses 24, by reason of their bevelled inner walls, to eventually move them laterally, causing automatic separation.

In operation the heads 10—20 are moved towards each other, causing the point of the catch 23 to press against the angular faces 15 of the detents, forcing them to separate or spring apart and eventually snap into the recesses 24 where they are maintained due to the side walls of the recesses.

It is to be noted that the included angle of the detent faces is far greater than the angle of the side edges 22, and by reason of the resiliency of the detent arms 12, the heads 10 and 20 may move in any direction within the limits of the angles.

In order to separate the heads further compression is exerted, causing the angular edges 22 within the recesses to spread the detents 14, whereupon a lateral or transverse relative movement takes place, due to the ramps 26, and thus the heads become completely separated automatically.

Figures 3, 4:
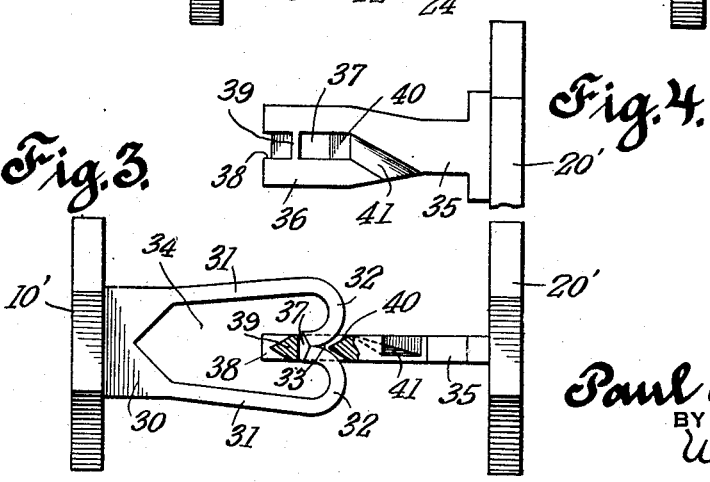
Figure 3 is a side elevational view of another form of the fastener elements, shown connected, parts being in section to disclose the structure.
Figure 4 is a side view of one of the elements in detail.

In the modified form of fasteners, shown in Figures 3 and 4, the button head 10' has a rigid stub 30 provided at its end with opposed spring arms 31 shaped at their outer ends to produce opposed curved inreaching elements 32 forming between their juxtaposed terminals an angular notch 33 leading to a space 34 encompassed by the arms.

The other member 20' has stub 35 leading to a flattened head 36 containing a rectangular aperture 37 and in the front edge is a guide recess 38 separated by a bar 39 from the aperture.

The bar 39 may preferably be bevelled as shown on both sides of its forward edge to readily enter the notch 33, pressing the arms 31 apart so as to pass over the bar and engage in the aperture 37.

The portion 40 of the head 36 contiguous to the aperture 37 may be similarly bevelled to force the arms 31 apart when pressure is brought to bear upon the heads 10'—20', one of the arms engaging in a recess 41 having a bevelled bottom leading angularly out of the side wall past its edge, thereby causing separation of the connecting elements in an obvious manner.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. A separable fastener comprising a member composed of a pair of unitary spring arms having opposed inreaching detents provided with inwardly inclined front faces, a second member having a flattened conical head to press said detents apart when forcibly applied, said head having recesses in its side edges to receive said detents thereby to prevent retraction, and ramps on said second member for automatically causing separation of said detents upon the application of further compressive force on said head and detents.

2. A separable fastener comprising a member composed of a pair of unitary spring arms having opposed inreaching detents provided with inwardly inclined front faces, a second member having a flattened conical head to press said detents apart when forcibly applied, said head having recesses in its side edges to receive said detents thereby to prevent retraction, and a flattened stem connecting said head and its support, said stem having inclined edges extending divergently from the bottoms of the recesses to spread said detents apart upon the exertion of compressive force on said members.

3. A separable fastener comprising a member composed of a pair of unitary spring arms having opposed inreaching detents provided with inwardly inclined front faces, a second member having a flattened conical head to press said detents apart when forcibly applied, said head having recesses in its side edges to receive said detents thereby to prevent retraction, a flattened stem connecting said head and its support, said stem having inclined edges extending divergently from the bottoms of the recesses to spread said detents apart upon the exertion of compressive force on said members, and means on the side of said stem to press said detents laterally causing their complete separation.

In testimony whereof I affix my signature.

PAUL BALBAUD.